United States Patent [19]

Honma et al.

[11] Patent Number: 5,019,627

[45] Date of Patent: May 28, 1991

[54] INJECTION-MOLDING POLYOLEFIN COMPOSITION

[75] Inventors: Shiro Honma, Ohtake; Kenichi Tominari, Iwakuni; Masayoshi Kurisu, Ohtake, all of Japan

[73] Assignee: Mitsui Petrochemical Industries, Ltd., Tokyo, Japan

[21] Appl. No.: 449,327

[22] Filed: Dec. 11, 1989

Related U.S. Application Data

[63] Continuation of Ser. No. 163,816, filed as PCT JP87/00468 on Jul. 3, 1987, published as WO88/00212 on Jan. 14, 1988, abandoned.

[30] Foreign Application Priority Data

Jul. 4, 1986 [JP] Japan .................. 61-156168

[51] Int. Cl.$^5$ .................. C08L 23/04; C08L 23/06
[52] U.S. Cl. .................. 525/240; 525/324
[58] Field of Search .................. 525/240, 324

[56] References Cited

U.S. PATENT DOCUMENTS

| | | | |
|---|---|---|---|
| 4,311,752 | 1/1982 | Diedrich et al. | 526/348 |
| 4,336,352 | 6/1982 | Sakurai et al. | 525/53 |
| 4,786,687 | 11/1988 | Sano et al. | 525/240 |
| 4,792,588 | 12/1988 | Suga et al. | 525/240 |
| 4,933,393 | 6/1990 | Toyota et al. | |

FOREIGN PATENT DOCUMENTS

| | | |
|---|---|---|
| 0057352 | 8/1982 | European Pat. Off. |
| 0186995 | 7/1986 | European Pat. Off. |
| 0227838 | 7/1987 | European Pat. Off. |
| 47-30293 | 8/1972 | Japan |
| 57-177036 | 10/1982 | Japan |
| 58-008712 | 1/1983 | Japan |
| 58-008713 | 1/1983 | Japan |
| 58-41309 | 9/1983 | Japan |
| 59-126446A | 7/1984 | Japan |

*Primary Examiner*—Carman J. Seccuro
*Attorney, Agent, or Firm*—Sherman and Shalloway

[57] ABSTRACT

An injection-molding polyethylene composition consisting essentially of ultrahigh-molecular-weight polyethylene having a molecular weight of at least about 1,650,000 and low-molecular-weight to high-molecular-weight polyethylene having a molecular weight of, for example, about 1500 to about 360,000. This composition is produced by a multistep polymerization process comprising a step of producing the ultrahigh-molecular-weight polyethylene and a step of producing the low-molecular-weight or high-molecular-weight polyethylene.

6 Claims, No Drawings

INJECTION-MOLDING POLYOLEFIN COMPOSITION

This application is a continuation of application Ser. No. 07/163,816 filed as PCT87/00468 on Jul. 3, 1987, published as WO88/00212 on Jan. 14, 1988 now abandoned.

FIELD OF TECHNOLOGY

This invention relates to an injection-molding polyolefin composition, and more specifically, to an injection-molding polyolefin composition suitable for obtaining injection-molded articles having excellent abrasion resistance and impact strength and being free from delamination.

BACKGROUND TECHNOLOGY

Ultrahigh-molecular-weight polyolefins, for example ultrahigh-molecular-weight polyethylene, have higher impact strength, abrasion resistance, chemical resistance, tensile strength, etc. than general-purpose polyolefins such as general-purpose polyethylene, and have found increasing applications as engineering plastics. The ultrahigh-molecular-weight polyethylene, however, has the defect that it is very difficult to mold by extrusion or injection-molding because it has a much higher melt viscosity and thus lower flowability than general-purpose polyethylene.

At present, therefore, most articles from ultrahigh-molecular-weight polyethylene are produced by compression molding, and only some articles such as rods are produced by extrusion-molding at very low speeds.

When such ultrahigh-molecular-weight polyethylene having low melt-flowability is molded by an ordinary injection-molding method, shear broken streams of the polymer always form during the filling of the polymer in a mold cavity, and the resulting molded article undergoes delamination like mica and cannot exhibit the excellent properties of the ultrahigh-molecular-weight polyethylene. Rather, its quality is inferior to that of a molded article of general-purpose polyethylene.

Japanese Patent Publications Nos. 30067/1982 and 58010/1985 propose an injection-molding method free from causing delamination, in which the capacity of a mold cavity is slightly increased before or after a resin is filled in the cavity, and then the resin is compressed to a predetermined volume. This method enabled production of injection-molded articles free from delamination and having the impact strength and abrasion resistance which are the inherent characteristics of the ultrahigh-molecular-weight polyethylene. To perform injection molding by this method, however, it is necessary to use an injection-molding machine equipped with a variable mold cavity system, and the general injection-molding machine for polyethylene cannot be used as it is.

On the other hand, for improving the melt-flowability of ultrahigh-molecular-weight polyolefins, mixing of an ultrahigh-molecular-weight polyolefin with a low to a high molecular weight polyolefin was proposed.

Japanese Patent Publication No. 27,064/1971 discloses an abrasion-resistant polyethylene resin composition comprising polyethylene having an average molecular weight of at least 500,000 and 20 to 50 % by weight of polyethylene having a density of at least 0.940 and an average molecular weight of 30,000 to 120,000.

Japanese Patent Publication No. 30,293/1972 discloses a process for producing a material for use in that surface of agricultural machines, earth-moving machines, etc. which comes into contact with the soil, which comprises mixing screw-extrudable polyethylene having a molecular weight of not more than 200,000 and produced by the medium-pressure or the low-pressure method with 10 to 30 % by weight of ultrahigh-molecular-weight polyethylene having a molecular weight of about 1 million and being incapable of screw-extrusion, melting the mixture uniformly, and continuously molding the uniform molten mixture by an extruder.

Japanese Patent Publication No. 41,309/1983 discloses a polyethylene composition comprising a mixture of 85 to 50 parts by weight of polyethylene having a viscosity average molecular weight of 500,000 to 150,000 and 15 to 50 parts by weight of granular ultrahigh-molecular-weight polyethylene having a viscosity average molecular weight of at least 1 million and a particle size smaller than 10 mesh.

Japanese Laid-Open Patent Publication No. 177,036/1982 discloses an ultrahigh-molecular-weight polyethylene composition having improved moldability comprising 100 parts by weight of ultrahigh-molecular-weight polyethylene having a molecular weight of at least 1 million and 10 to 60 parts by weight of low-molecular-weight polyethylene having a molecular weight of 5,000 to 20,000. The specification of this patent document states that the moldability of this ultrahigh-molecular-weight polyethylene composition is such that in the production of a slab having a thickness of 50 mm by a compression molding method, the molding cycle required was decreased to 200° C. ×2 hours while with the ultrahigh-molecular-weight polyethylene alone a molding cycle of 200° C. ×3 hours was required; and that in a ram extrusion method, the speed of pipe extrusion was increased from 5 cm/min. to 10 cm/min.

Japanese Laid-Open Patent Publication No. 126,446/1984 discloses an ultrahigh-molecular-weight polyethylene resin composition comprising 95 to 50 parts by weight of an ultrahigh-molecular-weight polyethylene resin and 5 to 50 parts by weight of a general-purpose polyolefin resin. The specification of this document discloses a composition in which a silane-modified polyethylene resin having a melt index of 2.5 or 5.0 g/10 min. is used as an actual specific example of the general-purpose polyolefin resin.

Japanese Patent Publication No. 41,309/1983 discloses a polyethylene composition comprising a mixture of 85 to 50 parts by weight of polyethylene having a viscosity average molecular-weight of 500,000 to 150,000 and 15 to 50 parts by weight of granular ultrahigh-molecular-weight polyethylene having a viscosity average molecular weight of at least 1 million and a particle size smaller than 10 mesh. As stated in column 3, lines 17-28 of this document, the moldability of the ultrahigh-molecular-weight polyethylene in this composition has not improved, but the purpose of providing this composition is to produce a molded article having excellent impact strength by reducing anisotropy utilizing the granular state of the ultrahigh-molecular-weight polyethylene.

The above polyethylene resin compositions are prepared by mixing ultrahigh-molecular-weight polyethylene with polyethylene or other polyolefins having lower molecular weights.

Japanese Laid-Open Patent Publication No. 94,593/1979 (corresponding to U.S. Pat. No. 4,414,369) discloses a process for producing a polyolefin having a broad molecular weight distribution by polymerizing an olefin in the presence of a solvent and hydrogen using a Ziegler-type catalyst of enhanced activity supported on a solid carrier to produce a polyolefin continuously, which comprises continuously feeding a main olefin monomer and at least one olefin comonomer under pressure using a plurality of reactors in which a gaseous phase containing an inert gas is present in the upper part of a first-stage reactor, and copolymerizing these monomers, continuously transferring the polymerization reaction mixture in which high-molecular-weight polymer particles are dispersed in a solvent to a second-stage reactor composed of a vertical stirred vessel maintained at a lower pressure than the first-stage reactor by differential pressures without substantially separating part of the components in the mixture and without using any forced transferring means, continuously performing polymerization in the second-stage stirred vessel in the presence of the main olefin monomer and hydrogen while a gaseous phase exists in the upper part of the stirred vessel, thereby to form a polymer having a lower molecular weight than in the first stage polymerization, continuously withdrawing the polymerization reaction mixture containing the resulting polymer particles dispersed in a solvent from the second-stage stirred vessel, and recovering the polymer.

Japanese Patent Publication No. 10,724/1984 (corresponding to U.S. Pat. No. 4,336,352) discloses a process in which polyethylenes of different molecular weights are produced by multi-stage continuous polymerization in at least three polymerization vessels connected in series. The purpose of this process is to produce polyethylene having excellent properties and moldability with high productivity. With regard to moldability, this process is for producing polyethylene by extrusion molding, above all blow molding, with improved die swelling. It does not relate to an improvement in an injection-molded article. Even when a composition containing not more than 10 % by weight of ultrahigh-molecular-weight polyethylene and having an MI of 0.3 or an intrinsic viscosity $\eta$ of 2.3 to 3.0 dl/g (corresponding to an MI of about 0.2 to 0.8) is used in injection molding, the content of ultrahigh-molecular-weight polyethylene is as low as not more than 10 % by weight.

Japanese Patent Publication No. 11,349/1971 discloses a process which comprises producing 5 to 30 % by weight of an ethylene/alpha-olefin copolymer having a reduced specific viscosity of 30 to 5 in a first step, and producing polyethylene or an ethylene/alpha-olefin copolymer having a reduced specific viscosity of 4.6 to 1.5 in a second stage to obtain a homogeneous mixture of it with the polymer obtained in the first stage. The purpose of this process is to improve moldability in the extrusion molding of bottles, cables, pipes, etc. and does not pertain to an improvement in an injection-molded article.

Japanese Laid-Open Patent Publication No. 141,409/1982 discloses a process for producing polyethylene which comprises polymerizing ethylene, or copolymerizing ethylene with an alpha-olefin, using a catalyst comprising a reaction product between a magnesium compound and a titanium halide and an organoaluminum compound; wherein the following three polymerization (a) a step of forming an ethylene polymer or copolymer having an alpha-olefin content of not more than 10 % by weight and an intrinsic viscosity $[\eta]$ of 0.3 to 1.5, (b) a step of forming an ethylene polymer or copolymer having an alpha-olefin content of not more than 30 % by weight and an intrinsic viscosity $[\eta]$ of 1.5 to 7, and (c) a step of forming an ethylene polymer or copolymer having an alpha-olefin content of not more than 30 % by weight and an intrinsic viscosity $[\eta]$ of 7 to 40, are carried out in any desired sequence, and the polymerization reactions are carried out while adjusting the ratio of the amounts of the polymers formed in step (a):step (b):step (c) to 1:0.1–1.5:0.01–1.2.

Japanese Laid-Open Patent Publication No. 8713/1983 discloses a process for producing an ethylenic copolymer which comprises copolymerizing ethylene and an alpha-olefin using a catalyst system obtained from (A) a solid catalyst component containing at least magnesium, halogen and titanium atoms and (B) an organoaluminum compound in at least two steps, wherein (1) in at least one step, 80 to 20 parts by weight of a copolymer having a high-load melt index of 0.03 to 10 g/10 min. and a density of 0.890 g/cm3 to less than 0.905 g/cm3 is produced, (2) in a second step, 20 to 80 parts by weight of a copolymer having a melt index of 10 to 5000 g/10 min. and a density of 0.905 to 0.940 g/cm$^3$ is produced, whereby a copolymer having a melt index of 0.02 to 30 g/10 min. and a density of 0.890 to 0.935 g/cm$^3$ is produced.

This patent document discloses that the highload melt index was measured at a temperature of 190° C. under a load of 21.6 kg in accordance with JIS K-6760.

Japanese Laid-Open Patent Publication No. 1983 discloses a process for producing an ethylenic copolymer using the same catalyst as described in the above-cited Japanese Laid-Open Patent Publication No. 1983 by multisteppolymerization, wherein (1) in at least one step, 80 to 20 parts by weight of a copolymer of ethylene with propylene and/or butene-1 having a high-load melt index of 0.03 to 10 g/10 min. and a density of 0.890 to 0.935 g/cm$^3$ is produced, and (2) in at least one other step, 20 to 80 parts by weight of a copolymer of ethylene and an alpha-olefin having at most 12 carbon atoms as a comonomer having a melt index of 10 to 5000 g/10 min. and a density of 0.890 to 0.940 is produced, said alpha-olefin containing at least 30 mole % of alpha-olefins having 5 to 12 carbon atoms, whereby a copolymer having a melt index of 0.02 to 30 g/10 min. and a density of 0.890 to 0.936 g/cm$^3$ is produced.

Japanese Laid-Open Patent Publication No. 120,605/1984 discloses a process for producing an ultra-high-molecular-weight polyethylene resin with improved moldability and processability, which comprises polymerizing monomers using a Ziegler-type catalyst comprising a solid catalyst component containing a transition metal ingredient and an organometallic catalyst component in at least two steps having different monomer compositions and hydrogen concentrations; wherein in at least one step, propylene or monomers mainly comprising propylene, or butene-1 or monomers mainly comprising butene-1 are polymerized in the presence of hydrogen to produce 2 to 60 % by weight, based on the entire polymer to be produced, of a polypropylene or polybutene-1 component, and in at least one remaining step, ethylene or monomers mainly comprising ethylene are polymerized in the substantial absence of hydrogen to produce 98 to 40 % by weight, based on the entire polymer produced, of an ultrahigh-molecular-weight polyethylene component.

British Patent No. 1,174,542 discloses a process for the preparation of a homo- or co-polymer of ethylene by a gaseous phase polymerization, or by a suspension polymerization in which the dispersion medium is in contact with a gaseous phase, of ethylene or a mixture comprising ethylene and up to 10 % by weight of an alpha-olefin that contains from 3 to 15 carbon atoms, which process comprises preparing from 5 to 30 % by weight of the total polymer in the presence of from 0 to 10 % of hydrogen, calculated on the total volume of the gaseous phase, and preparing from 70 to 95 % by weight of the total polymer in the presence of from 20 to 80 % of hydrogen, calculated on the total volume of the gaseous phase, both stages of the polymerization being carried out at a temperature within the range of from 50° to 120° C. and a pressure of up to 10 atmospheres gauge, in the presence of a catalyst which is present in the first stage in an amount sufficient for both stages, said catalyst comprising a) in the case of a suspension polymerization, from 0.05 to 0.3 millimol per litre of dispersion medium, or in the case of a polymerization in the gaseous phase, from 0.05 to 0.3 millimol per 0.5 litre of reactor volume, of a trivalent titanium compound that contains chlorine, and b) from 0.1 to 3.0 millimols of aluminum per litre of dispersion medium or reactor volume, in the form of an aluminum trialkyl having the general formula AlR, in which each R represents a hydrocarbon radical that contains from 4 to 40 carbon atoms, or in the form of the reaction product of an aluminum trialkyl or an aluminum alkyl hydride with a diolefin that contains from 4 to 20 carbon atoms.

Japanese Laid-Open Patent Publication No. 275,313/1986 laid-open after the priority date of the present application discloses an ultrahigh-molecular-weight polyethylene composition having improved injection-moldability which has an intrinsic viscosity, determined in decalin at 135° C., of 10 to 30 dl/g and obtained by polymerization reaction in at least two steps mentioned below.

(First step)

A step of forming 50 to 99.5 parts by weight of polyethylene having an intrinsic viscosity, determined in decalin at 135° C., of 12 to 32 dl/g by polymerizing ethylene in the absence of hydrogen or in a lowered hydrogen concentration with a catalyst comprising a solid catalyst component containing at least Mg, Ti and/or V and an organometallic compound.

(Second step)

A step of forming 50 to 0.5 parts by weight of polyethylene by polymerizing ethylene in a hydrogen concentration increased over that in the first step.

Likewise, European Laid-Open Patent Publication No. 0186995 laid-open after the priority date of the present application discloses a process for producing ultrahigh-molecular-weight polyethylene having an intrinsic viscosity, determined in decalin at 135° C., of to 30 dl/g by polymerization in at least two steps, which comprises (a) a first step of forming 70 to 99.5 parts by weight of polyethylene having an intrinsic viscosity, determined in decalin at 135° C., of 12 to 32 dl/g by polymerizing ethylene monomer in the absence of hydrogen or in the presence of hydrogen in a low concentration using a combination catalyst comprising a solid component containing at least magnesium, titanium and/or vanadium and an organometallic compound, and (b) a second step of forming 30 to 0.5 parts by weight of polyethylene having an intrinsic viscosity, determined in decalin at 135° C., of 0.1 to 5 dl/g by polymerizing a freshly fed ethylene monomer in the presence of hydrogen in a high concentration.

It is an object of this invention to provide an injection-molding polyolefin composition comprising an ultrahigh-molecular-weight polyolefin component and having very good injection-moldability.

Another object of this invention is to provide an injection-molding polyolefin composition which is suitable for obtaining an injection-molded article free from delamination without impairing the inherent excellent mechanical properties, such as high abrasion resistance, of the ultrahigh-molecular-weight polyolefin.

Other objects of the invention along with its advantage will become apparent from the following description In the present invention, the ultrahigh-molecular-weight polyolefin has an intrinsic viscosity $[\eta]_u$, measured in decalin at 135° C., of 10 to 40 dl/g, preferably 15 to 35 dl/g.

The other low-molecular-weight or high-molecular-weight polyolefin, as referred to in this invention, has an intrinsic viscosity $[\eta]_h$, measured in decalin solvent at 135° C., of less than 10 dl/g, preferably 0.1 to 5 dl/g, more preferably 0.5 to 3 dl/g.

The polyolefin in this invention is a homopolymer or copolymer of an alpha-olefin such as ethylene, propylene, 1-butene, 1-pentene, 1-hexene, 1-octene, 1-decene, 1-dodecene, 4-methyl-1-pentene and 3-methyl-1-pentene. The homopolymer of ethylene or a copolymer comprising ethylene as a main component and another alphaolefin of the type exemplified above is desirable.

The quantitative proportions of the ultrahigh-molecular-weight polyolefin and the low-molecular-weight or high-molecular-weight polyolefin are such that the ultrahigh-molecular-weight polyolefin accounts for 15 to 40 % by weight of the total weight of the two polymer or the low-molecular-weight or high-molecular-weight polyolefin accounts for 85 to 60 % by weight of the total weight of the two polyolefins. The preferred quantitative proportions are such that the proportion of the ultra-high-molecular-weight polyolefin is 20 to 35 % by weight based on the total weight of the two polyolefins.

The injection-molding polyolefin composition of this invention comprises the ultrahigh-molecular-weight polyolefin and the low-molecular-weight or high-molecular-weight polyolefin in the above quantitative proportions.

The injection-molding polyolefin composition of this invention has an intrinsic viscosity $[\eta]_c$, measured in decalin solvent at 135° C., of 4.0 to 10 dl/g and a melting torque T is measured by using a JSR curelastometer (made by Imanaka Machine Industry K. K.) under conditions involving a temperature of 240° C., a pressure of 5 kg/cm$^2$, an amplitude of 15° and a frequency number of 6 CPM.

The injection-molding polyolefin composition of this invention preferably has an $[\eta]_c$ of 4 to 9 dl/g.

The injection-molding polyolefin composition of this invention may be prepared by blending the ultrahigh-molecular-weight polyolefin and the low-molecular-weight or high-molecular-weight polyolefin in the proportions mentioned above. It has been found, however, that it can be advantageously prepared by a multistep polymerization method to be described below which comprises polymerizing olefins in the presence of a catalyst formed from a specific highly active solid titanium catalyst component and an organoaluminum compound catalyst component. The multistep polymerization method is carried out by polymerizing olefins in a multiplicity of stages in the presence of a Ziegler-type catalyst formed from (A) a highly active titanium catalyst component containing magnesium, titanium and halogen as essential ingredients and (B) an organoaluminum compound catalyst component. Specifically, in at least one polymerization step, an ultrahigh-molecular-weight polyolefin having an intrinsic viscosity $[\eta]_u$ of 10 to 40 dl/g is formed, and in another polymerization, an olefin is polymerized in the presence of hydrogen to give a low-molecular-weight or high-molecular-weight polyolefin having an intrinsic viscosity $[\eta]_h$ of 0.1 to 5 dl/g is formed.

The Ziegler-type catalyst used is basically a catalyst having specific properties formed from a solid titanium catalyst component and an organoaluminum compound catalyst component. Preferably, the solid titanium catalyst component is, for example, a highly active fine powdery catalyst component which has a narrow particle size distribution and an average particle diameter of about 0.01 to 5 micrometers and in which several fine spherical particles adhere firmly to one another. The highly active fine powdery titanium catalyst component can be prepared, for example, by the method of preparing the solid titanium catalyst component disclosed in Japanese Laid-Open Patent Publication No. 811/1981 in which at a time of precipitating a solid product by contacting a magnesium compound in solution with a titanium compound in solution, the precipitating conditions are strictly adjusted. For example, in the method disclosed in the above-cited Japanese Laid-Open Patent Publication which involves mixing a hydrocarbon solution of magnesium chloride and a higher alcohol with titanium tetrachloride at low temperatures, and heating the mixture to about 50° to 100° C. to precipitate the solid product, the precipitation is carried out in the presence of a slight amount, for example about 0.01 to 0.2 mole, per mole of magnesium chloride, of a monocarboxylic acid ester with strong stirring. If required, the product is washed with titanium tetrachloride. Thus, a solid catalyst component having satisfactory activity and particle form can be obtained. This catalyst component contains about 1 to about 6 % by weight of titanium, and has a halogen/titanium atomic ratio of about 5 to about 90 and a magnesium/titanium (atomic ratio) of about 4 to about 50.

Fine spherical particles having a narrow particle size distribution and an average particle diameter of usually 0.01 to 5 micrometers, preferably 0.05 to 3 micrometers, which are obtained by subjecting a slurry of the solid titanium catalyst component prepared as above to high-speed shear treatment are also preferably used. For high-speed shear treatment, a method is employed in which the slurry of the solid titanium catalyst component is treated with a commercial homomixer in an inert gaseous atmosphere for a suitable period of time. To prevent a reduction in catalyst performance at this time, there may also be employed a method in which an organoaluminum compound is added in a proportion equimolar to titanium. The treated slurry may be filtered through a sieve to remove coarse particles. By these methods, highly active fine powdery titanium catalyst components can be obtained.

The injection-molding polyolefin composition of this invention may be produced by slurry polymerization of olefins in at least two steps at a temperature of usually 0° to 100° C. in a hydrocarbon medium such as pentane, hexane, heptane or kerosene using the highly active fine powdery titanium catalyst component and an organoaluminum compound catalyst component optionally in combination with an electron donor. Examples of the organoaluminum compound catalyst component are trialkyl aluminums such as triethyl aluminum or triisobutyl aluminum, dialkyl aluminum chlorides such as diethyl aluminum chloride or diisobutyl aluminum chloride, alkyl aluminum sesquichlorides such as ethyl aluminum sesquichloride, or mixtures of these.

A multistep polymerization apparatus consisting of at least two polymerization vessel usually connected in series is used in the multistep polymerization process of olefins, and the polymerization is carried out in two steps, three steps, ... or n steps. The multistep polymerization may also be carried out batchwise in a single polymerization vessel. It is necessary, in at least one polymerization vessel in the multistep polymerization process, to form a specific amount of an ultrahigh-molecular-weight polyolefin. The step in which to form the ultrahigh-molecular-weight polyolefin may be a first polymerization step or an intermediate polymerization step or may comprise two or more stages. From the viewpoint of the polymerization treatment operations and the control of the properties of the resulting polyolefin, it is preferred that the ultrahigh-molecular-weight polyolefin be formed in the first polymerization step. Preferably, in the above polymerization step, 15 to 40 % of olefins to be polymerized in all steps are polymerized to give an ultrahigh-molecular-weight polyolefin having an intrinsic viscosity $[\eta]_u$ (measured in decalin solvent at 135° C.) of 10 to 40 dl/g, and further, by polymerizing 18 to 37 % by weight, especially 21 to 35 % by weight, of olefins to be polymerized in the entire polymerization steps, an ultrahigh-molecular-weight polyolefin having an intrinsic viscosity $[\eta]_u$ of 15 to 35 dl/g, especially 18 to 30 dl/g, is formed.

In the multistep polymerization process, the polymerization in the step of forming the ultrahigh-molecular-weight polyolefin may be carried out in the presence of a catalyst composed of the highly active titanium catalyst component (A) and the organoaluminum compound catalyst component (B). The polymerization may be carried out by a vapor-phase polymerization method or a liquidphase polymerization method. In any case, in the step of forming the ultrahigh-molecular-weight polyolefin, the polymerization reaction can be carried out in the presence of an inert medium as required. For example, the vaporphase polymerization method may be carried out in the presence of a diluent composed of an inert medium if required. The liquid-phase polymerization method may be carried out in the presence of a solvent composed of an inert medium as required.

In the polymerization step of forming the ultrahigh-molecular-weight polyolefin, it is preferred to use the highly-active titanium catalyst component (A) in an amount of about 0.001 to about 20 milligram atoms, especially about 0.005 to about 10 milligram-atoms, as titanium atoms per liter of the medium, and the organoaluminum compound catalyst component (B) in an amount corresponding to an Al/Ti atomic ratio of from about 0.1 to about 1,000, especially from about 1 to about 500. The temperature of the polymerization step of forming the ultrahigh-molecular-weight polyolefin is usually about −20° to about 120° C., preferably about 0° to about 100° C. The especially preferably from about 5 to about 95 pressure used in the polymerization reaction is within a range of pressures under which the liquid-phase polymerization or the vapor-phase polymerization is possible at the above temperatures. For example, it is atmospheric pressure to about 100 kg/cm², preferably from atmospheric pressure to about 50 kg/cm². The polymerization time in the polymerization step is set such that the amount of the pre-polymerized polyolefin formed is at least about 1000 g, preferably at least about 2000 g, per milligram of Ti in the highly active titanium catalyst component. To form the ultrahigh-molecular-weight polyolefin in the above polymerization step, the polymerization reaction is preferably carried out in the absence of hydrogen. After the polymerization reaction, the polymer may be isolated in an atmosphere of an inert medium and stored.

Examples of the inert medium that can be used in the polymerization step of forming the ultrahigh-molecular-weight polyolefin include aliphatic hydrocarbons such as propane, butane, pentane, hexane, heptane, octane, decane and kerosene, alicyclic hydrocarbons such as cyclopentane and cyclohexane, aromatic hydrocarbons such as benzene, toluene and xylene, halogenated hydrocarbons such as dichloroethane, methylene chloride and chlorobenzene, and mixtures of these. Use of the aliphatic hydrocarbons is especially preferred.

In the polymerization step of forming a polyolefin having an intrinsic viscosity of less than 10 dl/g in the process used in this invention, the remaining olefins are polymerized in the presence of hydrogen. If this polymerization step is the first polymerization step, the aforesaid catalyst composed of the highly active titanium catalyst component (A) and the organoaluminum compound catalyst component (B) is fed. If this polymerization step is the second or subsequent step, the catalyst contained in the polymerization product solution formed in the preceding step may be used directly. Or as required, the highly active titanium catalyst component (A) and/or the organoaluminum compound catalyst (B) may be additionally supplied. The proportion of the starting olefin polymerized in this polymerization step is 5 to 70 % by weight, preferably 20 to 60 % by weight, especially preferably 25 to 55 % by weight, based on the entire olefin components polymerized in the entire polymerization steps.

The proportion of hydrogen fed in this polymerization step is usually 0.01 to 50 moles, preferably 0.05 to 30 moles, per mole of the olefin fed in this step.

Preferably, the concentration of the catalyst components in the polymerization product solution in the polymerization vessel in this polymerization step is adjusted to about 0.001 to about 0.1 milligram-atom, preferably about 0.05 to about 0.1 milligram-atom, calculated as titanium atoms in the above treated catalyst, and the Al/Ti atomic ratio in the polymerization system is adjusted to from about 1 to about 1000, preferably from about 2 to about 500. For this purpose, the organoaluminum compound catalyst component (B) may, as required, be additionally used. Hydrogen, electron donors, halogenated hydrocarbons, etc. may be caused to be present in the polymerization system in order to adjust the molecular weight, molecular weight distribution, etc.

The polymerization temperature is preferably within temperatures at which slurry polymerization or vapor-phase polymerization is possible, and is at least about 40° C., especially about 50° to about 100° C. The polymerization pressure that can be recommended is atmospheric pressure to about 100 kg/cm², especially preferably atmospheric pressure to about 50 kg/cm². The polymerization time may desirably be such that the amount of the polymer formed is at least about 1000 g, especially preferably at least about 5000 g, per milligram-atom of titanium in the titanium catalyst component.

This step may be carried out by a vapor-phase polymerization method or by a liquid-phase polymerization method. Of course different polymerization conditions may be employed in different polymerization steps. As the liquid-phase polymerization method, a slurry suspensionpolymerization method is preferably employed. In any case, the polymerization reaction in the above polymerization step is carried out in the presence of an inert medium solvent. For example, the vapor phase polymerization may be carried out in the presence of a diluent composed of an inert medium and the liquid-phase slurry polymerization may be carried out in the presence of an inert solvent. Examples of the inert medium may be the same as the inert media exemplified with regard to the step of forming the ultrahigh-molecular-weight polyolefin.

The polymerization reaction is carried out so that the polyolefin composition obtained in the final polymerization step has an $[\eta]_c$ of usually 4.0 to 10 dl/g, preferably 4 to 9 dl/g, and a melting torque of not more than 4.5 kg-cm.

The multistep polymerization method may be carried out batchwise, semicontinuously or continuously.

Olefins to which the multistep polymerization method can be applied may be alpha-olefins such as ethylene, propylene, 1-butene, 1-pentene, 1-hexene, 1-octene, 1-decene, 1-dodecene, 4-methyl-1-pentene and 3-methyl-1-pentene. It may be applied to the production of homopolymers of these alpha-olefins, or the production of copolymers of at least two of these. Preferably, the method of this invention is applied to the production of an ethylenic polymer such as an ethylene homopolymer or a copolymer of ethylene as a major component and other alpha-olefin.

The injection-molding polyolefin composition of this invention may contain additives normally used for addition to polyolefins, such as thermal stabilizers, weatherability stabilizers, pigments, dyes, lubricants, inorganic fillers or reinforcing agents such as carbon black, talc or glass fibers, fire retardants and neutron shielding agents within the range which does not impair the objects of this invention.

Effects of the Invention

The injection-molding polyolefin composition of this invention can be injection-molded without substantially impairing the inherent excellent mechanical properties (such as abrasion resistance), chemical resistance, lubricity and non-water-absorption of ultrahigh-molecular-weight polyolefin and without molding failure and delamination in a molded article which are the defects of ultrahigh-molecular-weight polyolefin in the case of using a general-purpose injection-molding machine.

Accordingly, it can be conveniently used in various applications including not only bearings, gears and cams but also sliding members in household electrical appliances, and office automation machines in which conventional general-purpose polyolefins cannot find use because of poor abrasion resistance.

The following examples illustrate the present invention in more detail. The invention, however, should not be restricted to these examples unless it departs from its scope.

The intrinsic viscosity $[\eta]_h$ of the low-molecular-weight or high-molecular-weight polyethylene in the polyethylene compositions in the following examples was calculated by the following procedure.

(1) The density du of the ultrahigh-molecular-weight polyethylene and the density dc of the final polyethylene composition were measured, and the density dh of the low-molecular-weight or high-molecular-weight polyethylene is calculated in accordance with the following equation.

$$dh = \frac{dc - (du \times a)}{b}$$

wherein dh, dc and du are as defined above, a is the proportion of the ultrahigh-molecular-weight polyethylene in the final polyethylene composition, and b is the proportion of the low-molecular-weight or high-molecular-weight polyethylene in the final polyethylene composition.

(2) Low-molecular-weight or high-molecular-weight polyethylenes having various intrinsic viscosities were produced under substantially the same polymerization conditions (including the monomer composition and catalyst) as the conditions for producing the low-molecular-weight or high-molecular-weight polyethylene of which density dh was calculated as above except that the partial hydrogen pressure was varied. The relation between the densities and the intrinsic viscosities $[\eta]$ of the resulting polyethylenes was determined.

The density dh determined in (1) above of the low-molecular-weight or high-molecular-weight polyethylene in the polyethylene composition of this invention is taken as the density in the above relation, and the intrinsic viscosity $[\eta]_h$ is determined from the above relation.

The density of each of the samples was determined by the following procedure. Two sets of a stacked structure composed of an aluminum plate (3 ×300 ×300), an asbestos plate (5 ×250 ×250), a stainless plate (3 ×220 ×220) and a polyester film stacked in this order were prepared. One set was placed on the heating plate of a compression molding machine so that the polyester film was directed upward. A molding frame (2 ×200 ×200) was placed on it and the other set was superimposed on the frame so that the polyester film faced downward.

The sample was put in the frame and melted at 190° C.±2° C. without pressure, and then molded under a pressure of 300 kg/cm² for 5 minutes. Thereafter, the sample was cooled to 60°C. at a cooling rate of 15° ±2° C./ min., and taken out. The sample was maintained for 1 hour in a constant-temperature oil vessel at 120° ±0.2° C. and cooled to room temperature at a cooling rate of 1.5° C./ min. over the course of 1 hour. After cooling, the sample was taken out, and left to stand at room temperature for 1 hour. Then, the density of the sample was measured by a density gradient method (ASTM D-1505).

EXAMPLE 1

Preparation of a catalyst sample

Anhydrous magnesium chloride (47.6 g; 0.5 mol), 0.25 liter of decane and 0.23 liter (1.5 mol) of 2-ethylhexyl alcohol were heated at 130° C. for 2 hours to form a uniform solution, and then 7.4 ml (50 mmol) of ethyl benzoate was added. The uniform solution was added dropwise with stirring over 1 hour to 1.5 liters of TiCl$_4$ maintained at −5° C. The reactor used was a 3-liter separable glass flask, and the stirring speed was adjusted to 950 rpm. After the addition, the temperature was raised to 90° C., and the reaction was carried out at 90° C. for 2 hours. After the reaction, the solid portion was collected by filtration, and washed fully with hexane to give a highly active fine powdery titanium catalyst component containing 3.8 % by weight of titanium atoms.

Polymerization

Continuous polymerization was carried out by using a continuous two-step polymerization apparatus consisting of two 220-liter polymerization vessel connected to each other in series. To the first-step polymerization vessel (to be abbreviated as the polymerization vessel 1) in the continuous two-step polymerization apparatus 130 liters of n-hexane was added, and the temperature was raised to 60° C. n-Hexane (35 liters/hr), triethyl aluminum (45 mM/hr), the titanium catalyst component (1.0 milligram-atom/hr as titanium atoms) and ethylene gas (4.3 Nm3/hr) were continuously introduced into the polymerization vessel 1. By using a pump, the resulting polymerization reaction mixture slurry in the polymerization vessel 1 was fed to the second-step polymerization vessel (to be referred to as the polymerization vessel 2), and the level of the polymerization vessel 1 was maintained at 130 liters. The polymerization pressure in the polymerization vessel 1 at this time was 4.7 kg/cm²-G.

In addition to the polymerization mixture in slurry sent from the polymerization vessel 1, n-hexane and ethylene gas were continuously introduced into the polymerization vessel 2 at a rate of 25 liters/hr and 11.2 Nm³/hr, respectively. A moderate amount of hydrogen gas was added to adjust the composition of the vapor phase of the vessel 2 to an ethylene/hydrogen mole ratio of 1000:30. The slurry formed by the polymerization reaction was intermittently withdrawn from the bottom of the polymerization vessel 2 by using a timer valve, and the level of the polymerization vessel 2 was maintained at 120 liters. In the polymerization vessel 2, the polymerization temperature was 85° C. and the polymerization pressure was 7.2 kg/cm². The resulting polymer was separated from the solvent by a centrifuge, and dried in a stream of N$_2$.

The $[\eta]$ and contents of the components of the resulting polyolefin composition, the $[\eta]$ of the composition and its melting torque T were measured by the following methods.

$[\eta]$: intrinsic viscosity measured in decalin solvent at 135° C.

Melting torque (T): The stress torque of the sample in the molten state which was measured by using a JSR curelastometer (made by Imagawa Machine Industry K. K.) under conditions involving a temperature of 240° C., a pressure of 5 kg/cm², an amplitude of ±3 and a frequency of 6 CPM.

Injection molding

One hundred parts by weight of the polyolefin composition was mixed with 0.1 part by weight of tetrakis[-methylene(3,5-di-tert-butyl-4-hydroxy)hydrocinnamate]-methane (IRGANOX 1010, a tradename for a product of Japan Ciba-Geigy Co.), 0.1 part by weight of tetrakis[methylene-(2,4-di-tert-butylphenyl)-4,4-biphenylenediphosphite] (Sandostab P-EPQ, a tradename for a product of Sandoz AG) and 0.12 part by weight of calcium stearate (a product of Nippon Oils and Fats Co., Ltd.) by a Henschel mixer. Then, the mixture was molded into a rectangular plate (130 ×120 ×2 mm) and cut to prepare test samples.

Injection-molding conditions

Cylinder temperature (° C.): 200/230/270/270
Injection pressure kg/cm$^2$): primary/secondary =1000/800
Cycle (seconds): primary/secondary/cooling =5/3/25
Injecting speed (−): 2/10
Screw rotating speed (rpm): 97
Mold temperature (° C.) water cooled (32° C.)

The properties of the samples were evaluated by the following methods.

Tensile test

The tensile test was conducted in accordance with ASTM D-638 except that a test specimen having the shape of ASTM No. 4 was used and the tensile speed was set at 50 mm/min. The stress at yield (YS: kg/cm$^2$), tensile strength at break (TS: kg/cm$^2$) and elongation at break (EL: %) of the test sample was determined.

Izo impact strength (kg-cm/cm)

Measured in accordance with ASTM D256 on a notched test sample.

Olsen rigidity (kg/cm$^2$)

Measured in accordance with ASTM D747.

Friction-abrasion test

The test was conducted by using a Matsubara-type friction-abrasion tester (made by Toyo Baldwin Company) under a compression load of 3.4 kg/cm$^2$ at a friction speed of 30 m/min. for 24 hours, and the amount of loss by abrasion and the coefficient of friction were determined.

Appearance

The surface condition of a molded rectangular plate was visually observed and rated on the scale of the following four grades.
(A): No flowmark existed.
(B): Slight flowmarks were observed.
(C): Flowmarks were observed.
(D): Flowmarks existed throughout.

Delamination

The end of a molded sample was shaven by a knife, and delamination was evaluated on the scale of the following four grades.
(D): The surface was easily peeled.
(C): The surface was slightly peeled.
(B) The surface was hardly peeled.
(A): The surface was not peeled at all.

EXAMPLES 2-6

In each run, Example 1 was repeated except that the polymerization conditions were changed as indicated in Table 1, and the molecular weights of the ultrahigh-molecular-weight polyethylene and the low-molecular-weight or high-molecular-weight polyethylene and the ratio between the amounts of the ultrahigh-molecular-weight polyethylene and the low-molecular-weight or high-molecular-weight polyethylene were changed. The results are shown in Table 2.

REFERENTIAL EXAMPLES 1-2

Commercial ultrahigh-molecular-weight polyethylene (Hizex Million$^R$240M, a tradename for a product of Mitsui Petrochemical Industries, Co., Ltd.) was injection-molded using an injection-molding machine having a screw of the three-stage compression type.

Furthermore, commercial injection-molding high-density polyethylene (Hizex ® 2208J, a tradename for a product of Mitsui Petrochemical Industries, Ltd.) was injection-molded by the same method as in Example 1.

The results are also shown in Table 2.

TABLE 1

| | Polymerization conditions | | | | | |
|---|---|---|---|---|---|---|
| | Example 1 | Example 2 | Example 3 | Example 4 | Example 5 | Example 6 |
| Polymerization conditions in the first step | | | | | | |
| Amount of fine granular Ti catalyst (mg-atom) | 1.0 | 1.0 | 1.0 | 1.0 | 0.67 | 1.0 |
| Amount of the organoaluminum compound (mmol) | 45 | 45 | 45 | 45 | 45 | 45 |
| Temperature (°C.) | 60 | 50 | 40 | 40 | 60 | 50 |
| Pressure (kg/cm · G) | 4.7 | 4.7 | 4.8 | 6.3 | 4.6 | 4.9 |
| Feed rate of ethylene gas (Nl/hr) | 4300 | 6000 | 6000 | 6000 | 4000 | 4000 |
| Polymerization conditions in the second step | | | | | | |
| Temperature (°C.) | 85 | 65 | 65 | 80 | 80 | 65 |
| Pressure (kg/cm · G) | 7.2 | 4.1 | 4.1 | 7.4 | 5.2 | 5.1 |
| Feed rate of ethylene gas (Nl/hr) | 11200 | 18000 | 18000 | 15000 | 10000 | 7000 |
| Mol ratio of H$_2$/ethylene in the vapor phase | 30/1000 | 13/1000 | 30/1000 | 10/1000 | 8/1000 | 10/1000 |
| Amount of the polyolefin composition yielded (kg/hr) | 12 | 12 | 12 | 12 | 12 | 12 |

TABLE 2

| | Polyolefin composition | | | | | | | |
|---|---|---|---|---|---|---|---|---|
| | Example | | | | | | Referential Example | |
| | 1 | 2 | 3 | 4 | 5 | 6 | 1 | 2 |
| $[\eta]_u$ of ultrahigh-molecular-weight of polyolefin | 18.3 | 22.3 | 26.0 | 30.0 | 20.0 | 23.3 | 240M | 2208J |
| $[\eta]_h$ of low-molecular-weight | 0.7 | 0.8 | 0.7 | 0.7 | 2.0 | 0.8 | | |

TABLE 2-continued

| | Polyolefin composition Example | | | | | | Referential Example | |
|---|---|---|---|---|---|---|---|---|
| | 1 | 2 | 3 | 4 | 5 | 6 | 1 | 2 |
| or high-molecular-weight polyolefin | | | | | | | | |
| Properties of the polyolefin composition | | | | | | | | |
| Content of the ultrahigh-molecular-weight polyolefin (wt. %) | 21 | 25 | 25 | 25 | 25 | 35 | | |
| Content of the low to high molecular-weight polyolefin (wt. %) | 79 | 75 | 75 | 75 | 75 | 65 | | |
| $[\eta]_c$ (dl/g) | 4.7 | 6.0 | 5.6 | 8.5 | 7.2 | 8.9 | 18.0 | 1.5 |
| Melting torque T (kg · cm) | 1.0 | 2.0 | 1.4 | 3.0 | 4.0 | 4.0 | 42.0 | |
| Tensile Test | | | | | | | | |
| (YS) (kg/cm$^2$) | 321 | 362 | 289 | 309 | 261 | 339 | 242 | 320 |
| (TS) (kg/cm$^2$) | 178 | 209 | 232 | 222 | 121 | 152 | 185 | 200 |
| (EL) (%) | 280 | 280 | 230 | 110 | 110 | 230 | 16 | >500 |
| Izod impact strength (kg · cm/cm) | 4 | 22 | 9 | 6 | 68 | 70 | NB | 5 |
| Olsen rigidity (kg/cm$^2$) | 11300 | 9500 | 10900 | 12200 | 7700 | 8100 | 6000 | 12000 |
| Coefficient of friction ($\mu$) | 0.13 | 0.22 | 0.13 | 0.15 | 0.17 | 0.21 | 0.23 | 0.19 |
| Amount of loss by abrasion (mg) | 0.3 | 0.2 | 0.3 | 0.2 | 0.2 | 0.3 | 4.6 | 2.3 |
| Appearance | A | A | A | A | A | A | D | A |
| Delamination | A | A | A | A | A | A | D | A |

We claim:

1. An injection-molding polyethylene composition characterized in that
   (1) it comprises an ultrahigh-molecular-weight polyethylene having an intrinsic viscosity, measured in decalin solvent at 135° C., of 10 to 40 dl/g and a low-molecular-weight or high-molecular-weight polyethylene having an intrinsic viscosity, measured in decalin solvent at 135° C., of 0.1 to 5 dl/g,
   (2) the proportion of the ultrahigh-molecular-weight polyethylene is in the range of 15 to 40% by weight based on the total weight of the ultrahigh-molecular-weight polyethylene,
   (3) it has an intrinsic viscosity $\{\eta\}_c$, measured in decalin solvent at 135° C., of 4.0 to less than 10 dl/g,
   (4) it has a melting torque T of not more than 4.5 kg-cm, and
   (5) it is produced by a multistep polymerization process which comprises polymerizing ethylene in at least one polymerization step to form an ultrahigh-molecular-weight polyethylene having an intrinsic viscosity of 10 to 40 dl/g and polymerizing ethylene in another polymerization step in the presence of hydrogen to form a low-molecular-weight of high-molecular-weight polyethylene having an intrinsic viscosity of 0.1 to 5 dl/g, both in the presence of a Ziegler-type catalyst formed from (A) a highly active titanium catalyst component containing magnesium, titanium and halogen as essential ingredients and (B) an organoaluminum compound catalyst component.

2. The composition set forth in claim 1 wherein the ultrahigh-molecular-weight polyethylene has an intrinsic viscosity of 15 to 35 dl/g.

3. The composition set forth in claim 1 wherein the intrinsic viscosity of the low-molecular-weight or high-molecular-weight polyethylene is 0.5 to 3 dl/g.

4. The composition set forth in claim 1 wherein the proportion of the ultrahigh-molecular-weight polyethylene is 20 to 35 % by weight based on the total weight of the ultrahigh-molecular-weight polyethylene and the low-molecular-weight or high-molecular-weight polyethylene.

5. The composition set forth in claim 1 which has an intrinsic viscosity of 4 to 9 dl/g.

6. A molded article which is characterized in that
   (1) it has been prepared by injection molding the polyethylene composition of claim 1, and
   (2) it has no delamination.

* * * * *